(12) United States Patent
Nakagaki et al.

(10) Patent No.: US 8,526,710 B2
(45) Date of Patent: Sep. 3, 2013

(54) DEFECT REVIEW METHOD AND APPARATUS

(75) Inventors: Ryo Nakagaki, Kawasaki (JP); Minoru Harada, Fujisawa (JP); Takehiro Hirai, Ushiku (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1074 days.

(21) Appl. No.: 12/292,173

(22) Filed: Nov. 13, 2008

(65) Prior Publication Data

US 2009/0136121 A1  May 28, 2009

(30) Foreign Application Priority Data

Nov. 14, 2007  (JP) ................................. 2007-295036

(51) Int. Cl.
*G06K 9/00* (2006.01)
(52) U.S. Cl.
USPC ......................................... 382/149; 382/195
(58) Field of Classification Search
USPC ................................. 382/149, 195
See application file for complete search history.

(56) References Cited

U.S. PATENT DOCUMENTS

| | | | | |
|---|---|---|---|---|
| 5,940,534 A | * | 8/1999 | Wakahara et al. | 382/187 |
| 2001/0014858 A1 | * | 8/2001 | Hirayama | 704/238 |
| 2001/0033683 A1 | * | 10/2001 | Tanaka et al. | 382/149 |
| 2003/0053675 A1 | * | 3/2003 | Kuwabara | 382/145 |
| 2004/0086168 A1 | * | 5/2004 | Kuwabara | 382/145 |
| 2005/0201595 A1 | * | 9/2005 | Kamei | 382/118 |
| 2006/0133660 A1 | * | 6/2006 | Ogi et al. | 382/149 |
| 2006/0215901 A1 | * | 9/2006 | Nakagaki et al. | 382/149 |
| 2007/0126789 A1 | * | 6/2007 | Nishikori et al. | 347/40 |

FOREIGN PATENT DOCUMENTS

| | | |
|---|---|---|
| JP | 2001-331784 | 11/2001 |
| JP | 2006-126532 | 5/2006 |

* cited by examiner

*Primary Examiner* — Hadi Akhavannik
(74) *Attorney, Agent, or Firm* — Antonelli, Terry, Stout & Kraus, LLP.

(57) ABSTRACT

A candidate-defect classification method includes the steps of acquiring a scanning electron microscope (SEM) image of a candidate defect detected in an inspection from a sample including a pattern formed thereon, the inspection being preliminarily performed by an other inspection device; computing a feature value of the candidate defect by processing the SEM image; executing defect classification of the candidate defect as any one of a pattern shape defect and an other defect by using the computed feature value; acquiring positional information contained in design data of the pattern with respect to a candidate defect classified as the pattern shape defect; and extracting a systematic defect from among candidate defects classified as the pattern shape defects by performing a comparison of the positional information contained in the design data of the acquired candidate defect to positional information of a portion that has a high probability of causing a pattern formation failure and that has been obtained from the design data of the pattern, the systematic defect being caused due to a layout shape of the pattern, properties of a processor for forming the pattern, or the like.

16 Claims, 12 Drawing Sheets

FIG.4A  FIG.4B  FIG.4C
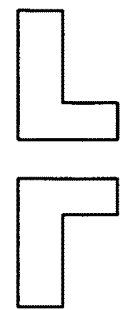 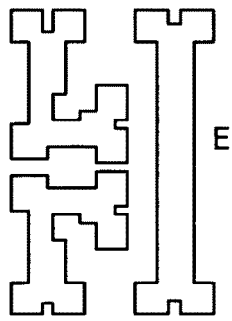 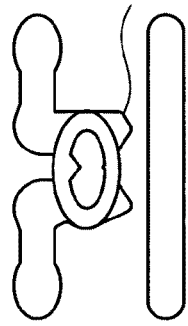
FIG.5A  FIG.5B  FIG.5C
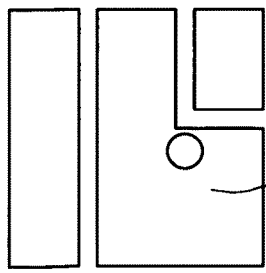 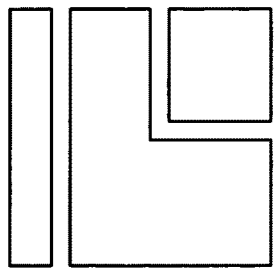 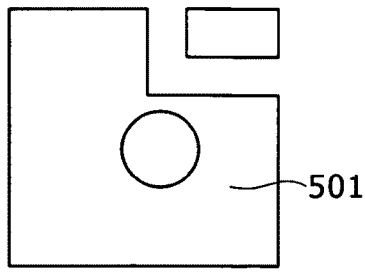

FIG.11

INSPECTION/REVIEW INFORMATION
DEVICE NAME: AAAA
INSPECTION STEP NAME: BBBB

DETERMINATION REFERENCE SPECIFICATION PARAMETERS
DESIGN DATA NAME: XX
UPPER LAYER NAME: YY
LOWER LAYER NAME: ZZ
PROCESSING AREA: 6 [μm]

DEFECT DETERMINATION REFERENCE
NUMBER OF TARGETS: XX[PIECES]
COVERAGE RATE: XX[%]

NUMBER OF UPPER-LAYER WIRINGS: ☐ ~ 1
☒ MINIMUM WIRING WIDTH ☐ [μm]
☐ MINIMUM INTERWIRING DISTANCE ☐ [μm]
☐ LOWER-LAYER WIRING WIDTH ☐ [μm]
☒ LOWER-LAYER INTERWIRING DISTANCE ☐ [μm]

NUMBER OF UPPER-LAYER WIRINGS: 2 ~ ☐
☐ MINIMUM WIRING WIDTH ☐ [μm]
☒ MINIMUM INTERWIRING DISTANCE ☐ [μm]
☒ LOWER-LAYER WIRING WIDTH ☐ [μm]
☒ LOWER-LAYER INTERWIRING DISTANCE ☐ [μm]

[ADD CONDITIONS] [SAVE]

HOT SPOT ID: 00021

CHIP EXTERIOR (●:SELECTED)

NON-DEFECTIVE PATTERN IMAGE

NON-DEFECTIVE PATTERN FEATURE VALUES
MINIMUM WIRING WIDTH [w] ☐ [μm]
MINIMUM INTERWIRING DISTANCE [d] ☐ [μm]
LOWER-LAYER DISTANCE [d] ☐ [μm]

DEFECT REVIEW METHOD AND APPARATUS

CLAIM OF PRIORITY

The present application claims priority from Japanese application serial no. JP2007-295036, filed on Nov. 14, 2007, the content of which is hereby incorporated by reference into this application.

BACKGROUND OF THE INVENTION

The present invention relates to a defect review method and apparatus for reviewing and classifying an image of a defect or the like occurring during manufacturing processes of a semiconductor wafer or the like.

Conventionally, in semiconductor wafer manufacture, an optical exposure process or method has been adapted as a circuit pattern transfer method. However, in recent years, as pattern integration has progressed, it has become difficult to form a fine mask pattern shape with fidelity on a wafer by use of the optical exposure method. As such, a method called "OPC" (optical proximity correction) has been widely used. Among other things, OPC is used to perform operations on integrated mask patterns, such as preliminarily addition of a graphic to a mask pattern, and corrects the size of a mask pattern corresponding to the density state of the mask pattern.

FIG. 4A shows a design layout of a circuit pattern. FIG. 4B shows an OPC mask. FIG. 4C shows an example of pattern formed on a wafer by using the OPC mask. In many cases, a design layout is configured from simple polygons, such as oblong rectangles. From the drawing figure, it can be known that corners of the layout have complex shapes corrected for layout patterns. When performing pattern correction by using the method of OPC, the operation of determining an OPC shape is performed. The operation is performed through pattern shape simulation by an exposure simulator or is performed by actually iteratively performing pattern transfer experiment so that the circuit pattern after corrected, that is, the circuit pattern to be transferred onto an actual wafer, becomes a desired circuit pattern.

In an ordinarily case, a step using the OPC is a step of forming a wiring at the level of several tens of nanometers. More specifically, in the step, for example, the wiring width of a wiring and the gap width between the wiring and a wire adjacent thereto are very small, and hence strict process control has to be carried out. In the case where an OPC correction is insufficient, a critical defect to the device is caused due to, for example, open-circuiting or short circuiting with the wirings (FIG. 4C shows an example of a short circuiting case). Hence, the OPC pattern design is an important task for manufacturing process development. The defect caused in a specific circuit portion of a wafer due to, for example, the circuit layout and the properties of pattern-forming equipment, such as the above-described pattern formation failure defect caused due to the OPC failure, is called "systematic defect."

In the case, for example, a recently available exposure simulator is used, the shape of a transferred circuit pattern can be predicted to some extent. Hence, in the case where shape simulation is executed on the exposure simulator by inputting various exposure conditions, a portion with low probability of making it possible to obtain a desired pattern, i.e., a portion (hot spot) with high probability of causing the pattern formation failure defect can be predicted. In the case where it is evaluated whether an OPC pattern is appropriate through actual exposure experiment, an image analysis operation is carried out in the manner that an image of the hot spot portion is acquired by using a measuring or metrological SEM (scanning electron microscope) having a resolution of the level of several nanometers. When a large deviation occurs between a formed pattern and a desired pattern, a corresponding OPC pattern has to be corrected, and the OPC pattern is determined by iteration of the simulation, experiment, or the like.

Device mass production is carried out after completion of design of an OPC pattern such as described above. However, evaluation of a transfer pattern with respect to a target hot spot is not performed only in the design event of the OPC pattern, but also is important in the wafer mass production stage. This is because, when the pattern shape defect is caused due to the pattern failure as described above, there is a high probability that the defect is critical for the device, such that the pattern shape defect that can occurs with fluctuation in process condition has to be monitored. Japanese Unexamined Patent Application Publication No. 2006-126532 discloses a conventional technique relative to a review method for reviewing a predetermined evaluation portion, which is represented by the hot spot or the like. According to the publication, an acquired image is compared to design data, thereby to detect the occurrence of a pattern shape defect.

In a semiconductor device manufacturing line, there also occur random defects whose defect occurrence position is not dependent on the circuit pattern. The random defects include, for example, foreign particles and scratch defects occurring in a planarization process of the wafer. Even such a random defect can be a cause of reducing the production yield, such that a countermeasure therefor is necessary. Conventionally, there has been made a countermeasure using a wafer inspection tool and a review tool.

The wafer inspection tool is used to perform high speed checking for detecting a position of a defect on the wafer. The device automatically processes an image acquired by imaging the state of the wafer surface by using an optical device or an electron beam, thereby to check the presence or absence of a defect. In the case of the inspection tool, since the high speed feature is important, the amount of image data is minimized by maximizing the pixel size of the image being acquired (that is, resolution minimization). Hence, in many cases, while the presence of a defect can be evaluated from a detected low resolution image, the type of the defect cannot be determined therefrom.

However, the review tool is used to acquire and review an image a respective image detected by the inspection device in the state where the pixel size is reduced (that is, a high resolution image). The respective a defect is classified by a defect root cause and the occurrence frequency and tendency of the defect is checked. Thereby, analysis can be implemented to detect the type of the defect, and consequently, a countermeasure guide for production yield can be obtained. The functions for automatically performing the image acquisition function and the image classification function are, respectively, called an ADR (automatic defect review) function and an ADC (automatic defect classification) function, and review tool including these functions are put into commercial markets. In the recent semiconductor manufacturing process field where the integration further advances, there are cases where the defect size reaches the order of several tens of nanometers or less, so that review tool each using a scanning electron microscope ("review SEM," herebelow) having a nanometer level resolution are widely used.

A conventional technique relative to, for example, the ADR and ADC provided in a review tool such as described above is disclosed in Japanese Unexamined Patent Application Publication No. 2001-331784. The publication describes, for example, the configuration of the review SEM, the functions and operation sequences of the ADR and ADC, and a method for displaying the acquired images and classification results.

As described above, defects reducing the semiconductor production yield are broadly classified as systematic defects and random defects. Conventionally, the former defects have been monitored by evaluating predetermined portions ("fixed point review," herebelow), and the latter defects have been monitored by the combination of the inspection tool and the review tool. In this manner, the process monitoring and production yield management for the exposure step have been performed.

However, as integration further advances and hence frequent use of the OPC technique for mask patterns becomes an ordinary practice, the above-described conventional monitoring method is about to be insufficient as a production yield management method. More specifically, when the number of portions (hot spots) to be monitored on a chip is increased to the level of several thousands by frequent use of the OPC, it is practically impossible to monitor all the hotspots in a mass production line. When only several tens of the hot spots are evaluated, there can occur a case where shape defects are overlooked, therefore resulting in failure in the detection of the process fluctuation.

Recent inspection tool have been technically advanced to an extent of having high detection sensitivity. Hence, there has been installed in a mass production line a tool having the potential capability of detecting a defect having the size of several tens of nanometers, which is equivalent to the size of a systematic defect. However, in the case of the conventional review tool, the defect cannot be automatically designated to be a systematic defect from an image of the defect. As such, also from this point of view, the occurrence of the systematic defect cannot be efficiently detected.

SUMMARY OF THE INVENTION

The present invention is to solve the problems described above and is to provide a defect review method and apparatus that are capable of efficiently detecting a systematic defect.

To achieve the above-described, according to one aspect of the present invention, there is provided a candidate-defect classification method including the steps of acquiring a scanning electron microscope (SEM) image of a candidate defect detected in an inspection from a sample including a pattern formed thereon, the inspection being preliminarily performed by an other inspection device; computing a feature value of the candidate defect by processing the SEM image; executing defect classification of the candidate defect as any one of a pattern shape defect and an other defect by using the computed feature value; acquiring positional information contained in design data of the pattern with respect to a candidate defect classified as the pattern shape defect; and extracting a systematic defect from among candidate defects classified as the pattern shape defects by performing a comparison of the positional information contained in the design data of the acquired candidate defect to positional information of a portion that has a high probability of causing a pattern formation failure and that has been obtained from the design data of the pattern, the systematic defect being caused due to layout of the pattern, properties of a equipment for forming the pattern, or the like.

Preferably, in the step of extracting the systematic defect, a portion having a high probability of causing a pattern formation failure is extracted from the design data of the pattern; a comparison is performed between coordinate data of the extracted portion and the positional information of the candidate defect classified as the pattern shape defect, the positional information (of the candidate defect) having been acquired in the step of acquiring positional information contained in design data; and the candidate defect classified as the pattern shape defect is extracted as the systematic defect when matching in the positional information within a predetermined error range.

Further, it is preferable that, in the step of extracting the systematic defect, the extraction of a systematic defect from among candidate defects classified as the pattern shape defects is carried out in a manner that a comparison is performed between systematic defect occurrence positional information preliminarily computed by using exposure simulation and stored and the positional information of the candidate defect classified as the pattern shape defect, the positional information (of the candidate defect) having been contained in design data; and the candidate defect classified as the pattern shape defect is extracted as the systematic defect when matching in the positional information within a predetermined error range.

Further, it is preferable that, in the step of acquiring positional information contained in design data of the pattern with respect to a candidate defect classified as the pattern shape defect, an image of the pattern is created from the design data of the pattern; alignment between the image of the pattern created from the design data and the SEM image of the candidate defect to thereby obtain an amount of misalignment; and the positional information contained in the design data of the pattern of the candidate defect classified as the pattern shape defect is acquired in accordance with the amount of misalignment between the images and the positional information of the candidate defect in the SEM image.

Further, it is preferable that any one of the images created from the design data and the SEM image of the candidate defect includes an image of a non-repetitive pattern.

Further, it is preferable that, in the step of extracting the systematic defect, among the candidate defects classified as the pattern shape defects, a candidate defect not extracted as the systematic defect in the comparison of the positional information is newly extracted as the systematic defect through evaluation performed using a systematic defect determination criteria.

Further, it is preferable that an image of patterns in a neighborhood inclusive of the portion that has a high probability of causing a pattern formation failure and that has been obtained from the design data of the pattern is created from the design data, and a pattern feature value is obtained from the created image, thereby to create the systematic defect determination criteria by using the obtained pattern feature value.

Further, it is preferable that the pattern feature value to be obtained includes information of an inter-pattern distance and a pattern width in the created pattern image.

According to another aspect of the present invention, there is provided a candidate-defect classification apparatus including a scanning electron microscope (SEM) image acquisition device that acquires a candidate defect detected in an inspection from a sample including a pattern formed thereon, the inspection being preliminarily performed by an other inspection device; an image processing device that computes a feature value of the candidate defect by processing the SEM image acquired by the SEM image acquisition device; a defect classifying device that classifies the candidate defect as any one of a pattern shape defect and an other defect by using the computed feature value; a positional information acquisition device that acquires from design data information of the pattern stored in a database, positional information contained in design data of the pattern with respect to a candidate defect classified as the pattern shape defect by the defect classifying device; and a systematic defect extraction device that extracts a systematic defect from among candidate defects classified as the pattern shape defects by performing a comparison of the positional information contained in the design data of the candidate defect acquired by the positional information acquisition device to positional information of a portion that has a high probability of causing a pattern formation failure and that has been obtained from the design data of the pattern, the systematic defect being caused due to a layout of the pattern, properties of a equipment for forming the pattern, or the like.

Preferably, in the systematic defect extraction device, a portion having a high probability of causing a pattern formation failure is extracted from the design data of the pattern; a comparison is performed between coordinate data of the extracted portion and the positional information of the candidate defect classified as the pattern shape defect, the positional information (of the candidate defect) having been acquired in the step of acquiring positional information contained in design data; and the candidate defect classified as the pattern shape defect is extracted as the systematic defect when matching in the positional information within a predetermined error range.

Further, it is preferable that, in the systematic defect extraction device, the extraction of a systematic defect from among candidate defects classified as the pattern shape defects is carried out in a manner that a comparison is performed between systematic defect occurrence positional information preliminarily computed by using exposure simulation and stored and the positional information of the candidate defect classified as the pattern shape defect, the positional information (of the candidate defect) having been contained in design data; and the candidate defect classified as the pattern shape defect is extracted as the systematic defect when matching in the positional information within a predetermined error range.

Further, it is preferable that, in the positional information acquisition device, an image of the pattern is created from the design data of the pattern stored in the database; alignment between the image of the pattern created from the design data and the SEM image of the candidate defect to thereby obtain an amount of misalignment; and the positional information contained in the design data of the pattern of the candidate defect classified as the pattern shape defect is acquired in accordance with the amount of misalignment between the images and the positional information of the candidate defect in the SEM image.

Further, it is preferable that any one of the images created in the positional information acquisition device from the design data and the SEM image of the candidate defect includes an image of a non-repetitive pattern.

Further, it is preferable that, in the systematic defect extraction device, among the candidate defects classified as the pattern shape defects, a candidate defect not extracted as the systematic defect in the comparison of the positional information is newly extracted as the systematic defect through evaluation performed using a systematic defect determination criteria.

Further, it is preferable that, in the systematic defect extraction device, an image of patterns in a neighborhood inclusive of the portion that has a high probability of causing a pattern formation failure and that has been obtained from the design data of the pattern is created from the design data, and a pattern feature value is obtained from the created image, thereby to create the systematic defect determination criteria by using the obtained pattern feature value.

Further, it is preferable that the pattern feature value to be obtained includes information of an inter-pattern distance and a pattern width in the created pattern image.

According to the above, since the shape feature of the non-defective pattern can be utilized in the defect classification, it can be determined whether the defect is the systematic defect that is caused due to the shape of a circuit pattern. In the defect review method and apparatus, the image of the non-defective pattern corresponding to the respective defect portion may be either image data created by imaging circuit design data or image data created by imaging a portion where a circuit pattern identical to the defect portion is expected to be actually formed.

In the case where the design data is used, it is possible to use not only information of, for example, the shape of a circuit pattern on an uppermost layer of a review-target wafer and the shape of a circuit pattern adjacent thereto, but also information of a lower-layer pattern can be used in the event of comparison. Consequently, the accuracy of systematic defect detection can be expected to be improved as compared to the case where the image is actually acquired.

According to the present invention, the systematic defect can be efficiently detected from defects detected by the wafer inspection device.

These and other objects, features and advantages of the invention will be apparent from the following more particular description of preferred embodiments of the invention, as illustrated in the accompanying drawings.

BRIEF DESCRIPTION OF THE DRAWINGS

Embodiments of the present invention will be described in detail based on the following figures, wherein:

FIG. 4A is a view showing a design layout of a circuit pattern;

FIG. 4B is a view showing a pattern formed on an OPC mask;

FIG. 4C is a view showing an example pattern formed on a wafer by using the mask shown in FIG. 4B;

FIG. 5A is a view showing a defect image (an image taken of an area of a defect portion at a low multiplication);

FIG. 5B is a view showing a reference image;

FIG. 5C is an image taken of the defect position of FIG. 5A at a high multiplication;

FIG. 11 is a front view of a specification screen for specifying a systematic defect determination criteria;

DESCRIPTION OF THE PREFERRED EMBODIMENTS

The present invention relates to a defect review apparatus and method that classify a candidate defect as any one of a systematic defect and an other defect by use of an image acquired (captured or imaged) by a SEM. The method and apparatus operate as below. A SEM image is acquired in the manner that a candidate defect preliminarily detected through inspection of a sample including a pattern(s) performed by using an other inspection device (such as an optical brightfield defect inspection device, an optical darkfield defect inspection device, or a SEM defect inspection device) is imaged by a SEM by using positional information of the candidate defect. A feature value of the candidate defect is computed through processing of the SEM image. Then, the candidate defect is classified as any one of a pattern shape defect and an other defect by using the computed feature value. Then, positional information on design data of the candidate defect is compared to positional information of a portion with high probability of formation defect occurrence, thereby to extract a systematic defect that is caused due to, for example, a layout of the pattern and properties of a processing tool employed to form the pattern from the candidate defect classified as into the pattern shape defect.

Practical embodiments of the respective defect review apparatus and method will be described below.

(First Embodiment)

A first embodiment of the present invention will be described herebelow.

Figure 1:
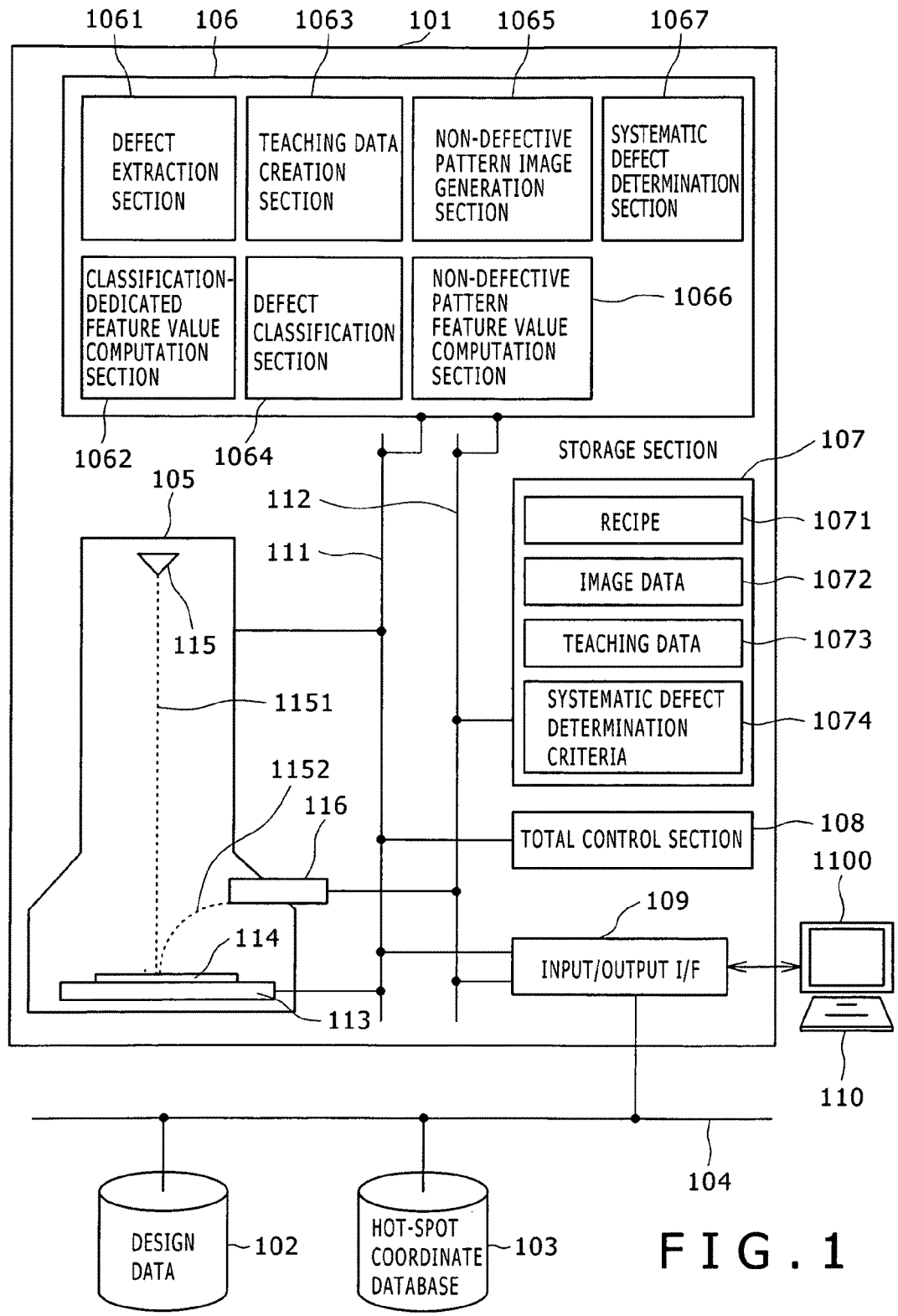
FIG. 1 is a block diagram showing the general configuration of a defect review system.

FIG. 1 is a view showing the configuration of a system for executing the defect review method according to the present invention. A review SEM 101 is configured to include an electronic optical system 105 that acquire electronic microscope images; a processor and analyzer section 106 that executes various processes; a storage section 107 that stores various data therein; an input/output I/F 109 (I/F=interface) that performs data input or output in communication with the outside, and a total control section 108 that controls the respective sections. The respective sections are interconnected via a control bus 111 and a data bus 112. The input/output I/F 109 is connected to an input/output terminal 110, such as a display/keyboard. An operator is enabled to issue instructions or commands or to verify the apparatus status via the input/output terminal 110.

In the electronic optical system 105, a sample 114, such as a wafer, is mounted on a moveable stage 113. An electron beam 1151 is irradiated onto a review portion from an electron gun 115, electrons 1152 (secondary or reflective electrons) emitted therefrom are acquired or detected by a detector 116, and an amount of the detection is imaged as brightness information. Thereby, a review image can be obtained. Note here that FIG. 1 does not show components, such as lens electrodes and deflecting electrodes, of the configuration. These components are provided in an ordinarily SEM such as the above-described one that scans by irradiating the electron beam 1151, which is formed by thinly reducing electrons emitted from the electron gun 115 disposed between the electron gun 115 and the stage 113.

The review SEM 101 is connected to design data 102 and a hot-spot coordinate database 103 via a network 104. The hot-spot coordinate database 103 stores therein the results of prediction performed by use of a tool such as exposure simulation to detect portions (hot spots) likely causing systematic defects. More specifically, the hot-spot coordinate database 103 store therein coordinate values.

The storage section 107 stores therein various data for use in the event of defect review that is performed in the review SEM 101. The data is inclusive of a recipe 1071, image data 1072, teaching data 1073, a systematic defect determination criteria 1074.

The recipe 1071 contains various condition values that are to be specified in the event of imaging the sample 114 by use of the electronic optical system 105. The recipe 1071 is inclusive of imaging conditions. For example, the conditions are:

an accelerating voltage as a setting parameter of the electronic optical system 105 (accelerating voltage: voltage for accelerating the electron beam 1151 when irradiating the sample 114 with the electron beam 1151 emitted from the electron gun 115 and focused;

a probe current (current of the electron beam for irradiating the sample 114); and the number of addition image frames (when images of one frame are obtained through a single scan, which is to be performed with irradiation of the electron beam 1151 focused on a desired area or the sample 114, on the entirety of the desired area, a large amount of noise component is included in the images, so that the images are poor in S/N ratio. In order to improve the S/N ratio of the images, images of multiple frames are further acquired through multiple scans of the desired area, and the images of the multiple frames are added.)

The teaching data 1073 refers to data that is used when performing automatic classification of defects of the sample 114. In this case, the defects each refer to a defect detected by processing a SEM image taken of the sample 114 and obtained by performing a detection of the electrons 1152 (secondary or reflective electrons), which are generated from the sample 114, by use of the detector 116 through scanning performed by irradiation of the electron beam 1151 focused on the sample 114 by use of the electronic optical system 105. The systematic defect determination criteria 1074 refers to reference data that is used to determine whether an imaged defect is a systematic defect. The contents of the systematic defect determination criteria 1074 will be described below.

Further, the processor and analyzer section 106 includes respective functions necessary in a defect review process in the review SEM 101. A defect extraction section 1061 has a function that designates an area including a defect from an imaged image. A classification-dedicated feature value computation section 1062 has a function of computing the quantity of features from a designated defect portion, such as the size and image brightness of the defect portion, and a quantitative value of texture or the like. Further, teaching data creation section 1063 is a section that creates teaching data necessary in the event of automatic classification of defects.

A defect classification section 1064 has a function that performs a comparison between the teaching data and the feature value computed from a defect image under review, thereby to execute automatic classification of the defect. A non-defective pattern image creation section 1065 has a function that creates a non-defective pattern image of the periphery of a coordinate position in design data specified in the hot-spot coordinate database 103 or the like.

A non-defective pattern feature value computation section 1066 has a function that computes the feature value from an image created by the non-defective pattern image creation section 1065. A systematic defect determination section 1067 has a function that performs a comparison between the computed non-defective pattern feature value and the systematic defect determination criteria stored in the storage section 107, thereby to determine whether the defect currently under view is the systematic defect.

Next, the defect review method to be carried out by use of the system shown in FIG. 1 according to the present invention will be described herebelow. The defect review method of the present embodiment includes two processing procedures. One is a preliminary processing procedure (or, "processing sequence") (shown in FIG. 2) for execution prior to the defect review, and the other is a systematic defect determination processing procedure (or, "processing sequence") (shown in FIG. 3) for execution of the defect review.

Figure 2:
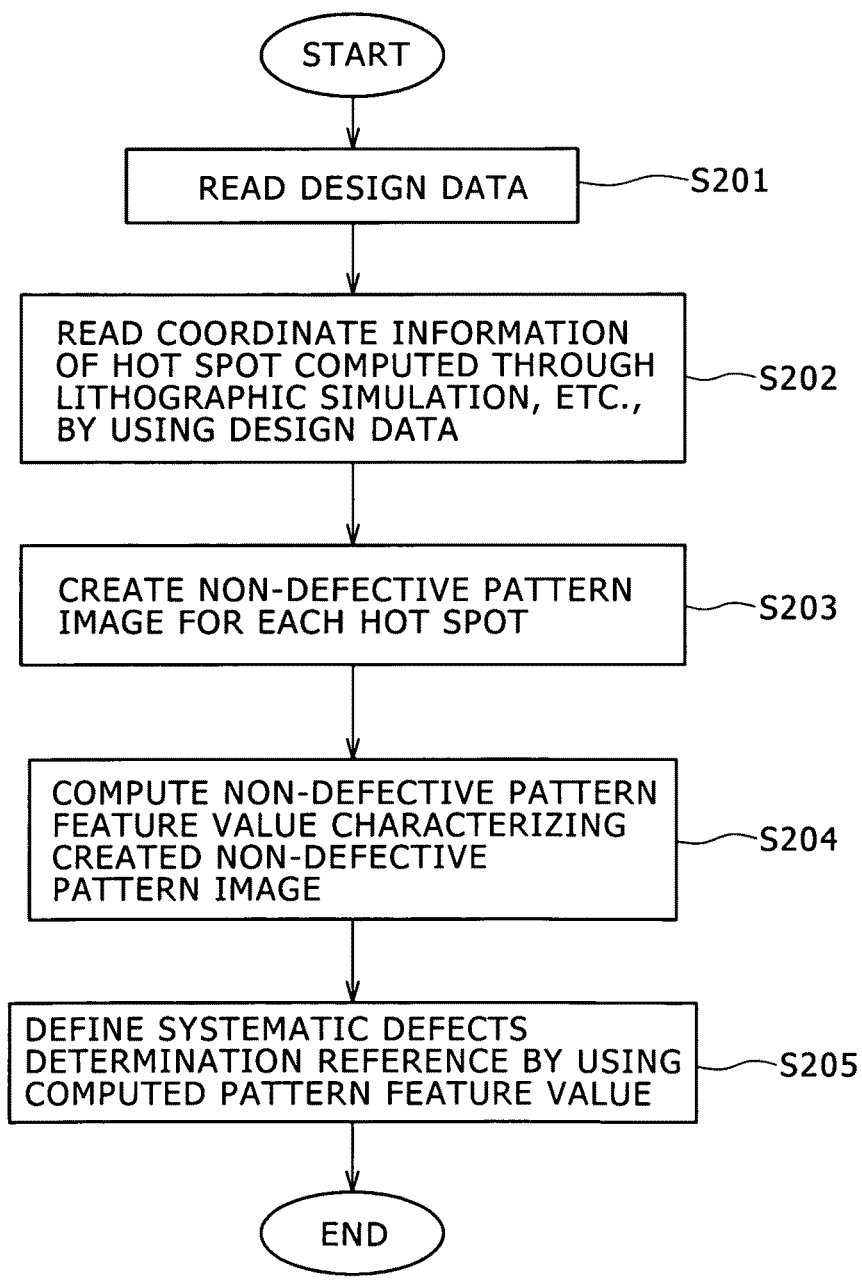
FIG. 2 is a flow diagram of a preliminary process in a defect review method.

FIG. 2 is the preliminary processing sequence, which is executed prior to defect review. The processing sequence is to set the determination criteria for the systematic defect. First, in response to an instruction from the total control section 108, design data of wiring patterns (patterns of wiring lines) formed on a semiconductor wafer targeted for defect review is read into the processor and analyzer section 106 from the design data 102 (at step S201). Further, coordinate data of hot spots (each refers to a portion with high probability of systematic defect occurrence) computed by use of lithographic simulation is read into the processor and analyzer section 106 from the hot-spot coordinate database 103 (at step S202). Thereafter, a non-defective pattern image is created for the respective hot spot in the non-defective pattern image creation section 1065 of the processor and analyzer section 106 (at step S203).

The design data refers to layout data. The layout data is data formed to be able to represent layout data in the manner that a circuit pattern, such as wiring pattern is represented by combination of polygon data, such as four-sided shape data, and the coordinate positions of apexes of the respective polygon data are stored. Step S203 refers to the process of transforming to image data from the layout data, that is, the coordinate data, for the respective hot spot.

Figure 8:
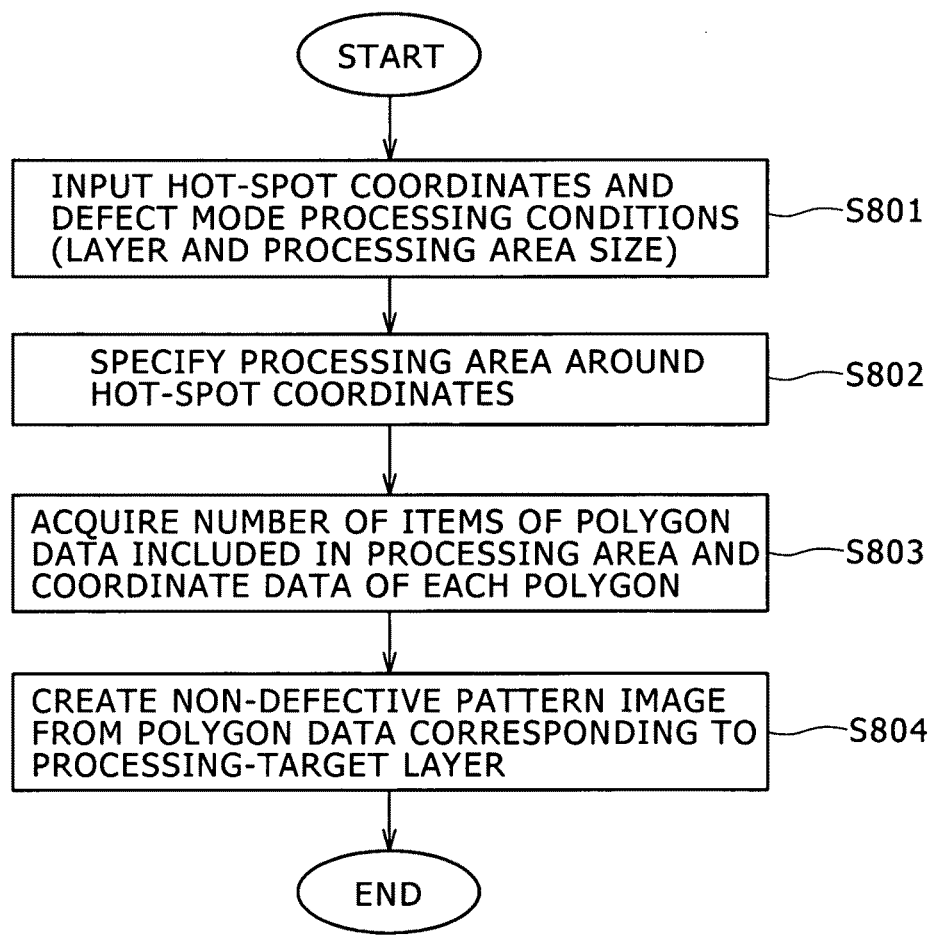
FIG. 8 is a flow diagram for creation of a non-defective pattern image in the preliminary process of the defect review method.

FIG. 8 shows a detailed procedure of the above-described process. First, a hot spot coordinate necessary to create a non-defective pattern image is read from the hot-spot coordinate database 103. In addition, processing conditions, or more specifically, a processing target layer and processing area size, which were preliminarily read from the design data 102 and stored into the recipe 1071 of the storage section 107, are read into the non-defective pattern image creation section 1065 of the processor and analyzer section 106 (at step S801).

Subsequently, the processing area is set (at step S802). More specifically, a square area formed with one side of a value in a parameter-specified range about the coordinate position of the hot spot as the center. Then, wiring polygon data present in portions overlapping with the processing area are retrieved with respect to the design data read in the earlier step. Thereby, the number of items of polygon data in the above-described area and the coordinate data of the respective polygon data are acquired (at step S803). In this event, the retrieval process is executed corresponding to each layer specified in the earlier step. Then, a non-defective pattern image is formed from the retrieved polygon data in correspondence to the respective layer (at step SS804).

Figure 9A:
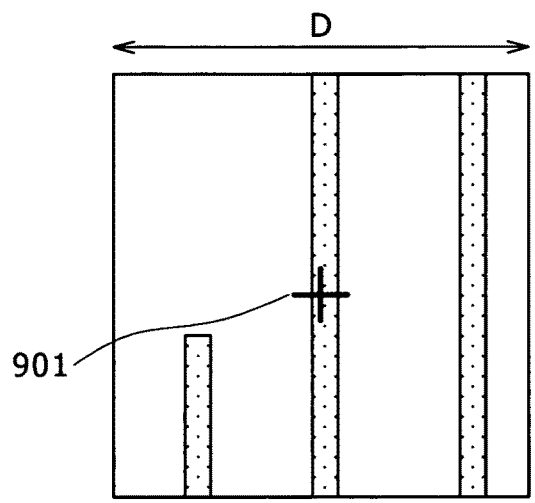
FIG. 9A is a view showing a non-defective pattern image of a lower layer.
Figure 9B:
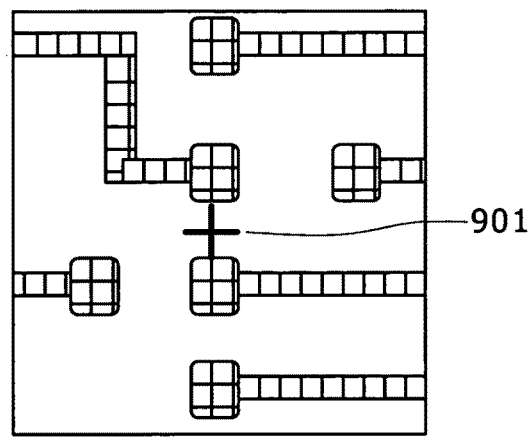
FIG. 9B is a view showing a non-defective pattern image of an upper layer.
Figure 9C:
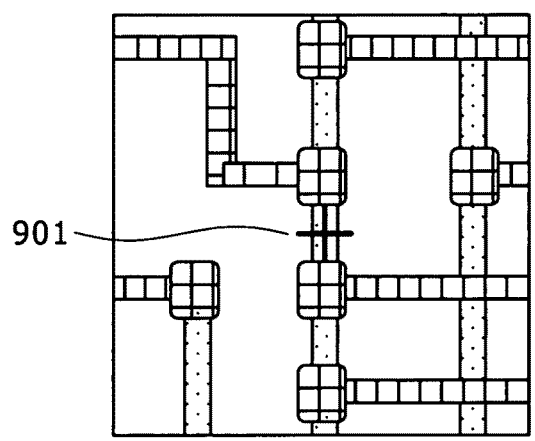
FIG. 9C is a view showing non-defective pattern image displayed as a superposed representation of the upper layer and the lower layer.
Figure 9D:
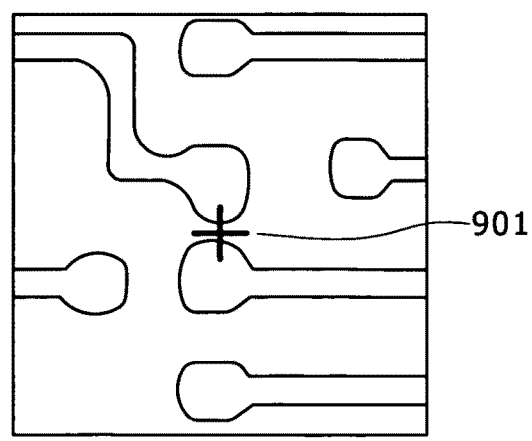
FIG. 9D is a view showing a SEM image when the portion shown in FIG. 9C is viewed by a SEM.

FIGS. 9A to 9C, respectively, show creation result examples of non-defective pattern images. In this case, the examples are examples of non-defective pattern images created by use of design data or two layers. Numeral 901 represents a hot spot coordinate position read from the hot-spot coordinate database 103, and a length D of one side of the image to be created is specified in a parameter. FIGS. 9A and 9B are examples of non-defective pattern images created from polygon data included in processing square areas each formed to have the one-side length D about the hot spot coordinate as the center for two layers different from one another. The pattern image is created into a bitmap format that is ordinarily used.

Here, it is assumed that the number of pixels of the image (i.e., the resolution level of the image) is predetermined such that one line of wiring, for example, is represented by ten or more pixels on the basis of the width of the forming wiring of the drawing figures, FIG. 9A is a lower layer, and FIG. 9B is an upper layer. FIG. 9C is a superposed representation of the two layers. When the portion is reviewed, the wiring pattern of the lower layer cannot be ordinarily detected by the SEM, such the process described above corresponds to the non-defective pattern image creation section at step S203 of FIG. 2.

Subsequently, a non-defective pattern feature value is computed by use of the created non-defective pattern image (at step S204). The pattern feature value represents the width and interwiring distance of each of multiple wirings.

Figure 10:
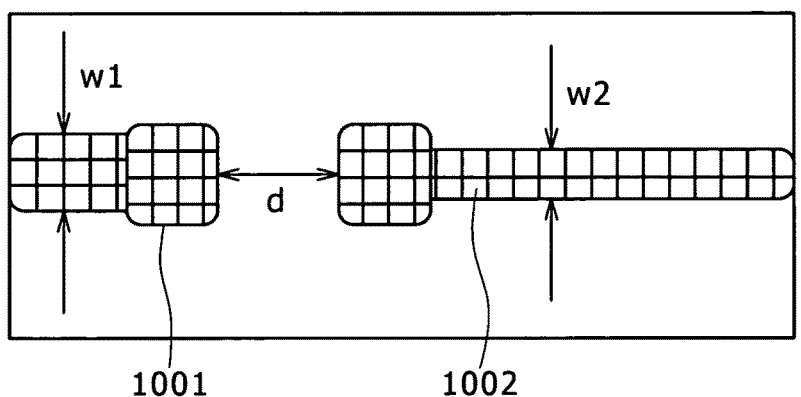
FIG. 10 is a plan view of a pattern showing a computed example of a non-defective pattern feature value, in which shown is a feature value computed in an example case where two wirings are present in an area.

FIG. 10 shows feature values in an example case where two wirings exist in an area. More specifically, two wirings 1001 and 1002 exist or are present in the drawing figure. First, minimum wiring widths of the respective wirings. 1001 and 1002 are obtained. In the drawing figure, the wiring widths of the wirings 1001 and 1002 are represented by W1 and W2, respectively. Then, the minimum one of the widths is determined as the feature value (in the drawing figure case, since W2<W1, W2 is determined as the feature value). Further, as another feature value, the interwiring minimum distance d is computed. As described above, the non-defective pattern feature values to be finally output are the minimum width of wirings present in the processing area and the interwiring minimum distance.

Even in the case where three or more wiring patterns are present in a processing area, two values, namely the wiring width and the minimum interwiring distance. The value of the wiring width is computed in the manner that the wiring widths of the respective wiring patterns are computed, and the minimum one of the values of the wiring widths is obtained. The minimum interwiring distance is computed in the manner that the process of computing the distance between two wirings arbitrarily selected is executed for respective combined sets (pairs) of two wiring patterns among all the wiring patterns, and the minimum one of the computed values of the distances is computed as one minimum interwiring distance. Hence, two feature values are computed in units of one layer, regardless of the number of wiring patterns present in one processing area. That is, in the case where multiple layers are specified, two values of the minimum wiring width and the minimum interwiring distance are computed corresponding to the respective one of the layers.

According to the above description, image processing is executed on the result of imaging of design layout data, but the method is not limited to thereto. Any method may be employed inasmuch as the method is capable of executing the feature value computation. More specifically, the feature value may be directly extracted from the layout data without use of images. Further, according to the above description, the data created from the imaged design layout is used. However, the data may be replaced with image data created by actually imaging the non-defective pattern by use of the SEM or an other imaging device (means).

Referring to FIG. 2, at a final process (step S205), the systematic defect determination criteria is defined by use of the non-defective pattern feature value having been obtained. More specifically, in definition of the determination criteria, threshold value or values are defined that is or are compared with both or one of the two values, namely, the inter-wiring minimum distance and/or minimum wiring width obtained in the earlier step. For example, in the case that threshold values (TH1 and TH2, for example) are provided for the respective minimum wiring width and interwiring distance, the determination criteria is defined such that, when "minimum wiring width<TH1, and interwiring distance<TH2," the corresponding non-defective pattern is a systematic defect candidate.

Further, the determination criteria is defined in more detail by combining additional conditions therewith. For example, the additional conditions include conditions regarding whether to take factors, such as the number of wiring patterns of the lower layer in the processing area, the wiring widths of the patterns, and the interwiring distances thereof, into consideration, and conditional branching regarding the number of wiring patterns of the upper layer in the processing area. This concept makes it possible to define, for example, a determination criteria including two conditions such as described herebelow.

[Condition 1] The number of upper-layer wiring patterns in the processing area: 1

Minimum wiring width of the upper-layer circuit pattern<TH1.

[Condition 2] The number of upper-layer wiring patterns in the processing area: 2 or more The minimum wiring width of the upper-layer circuit pattern<TH1;

The minimum interwiring distance of the upper-layer circuit pattern<TH2;

The number of lower-layer wiring patterns of the lower-layer circuit pattern>TH3;

The minimum wiring width of the lower-layer circuit pattern<TH4; and

The minimum interwiring distance of the lower-layer circuit pattern<TH5.

In practice, the set-up procedure of the systematic defect determination criteria is carried out through a specification screen, such as exemplified in FIG. 11. FIG. 11 is an example operation screen that allows verification or correction of, for example, the contents and results of processes in a specification method for the systematic determination criteria and that is displayed on a display screen 1100 of the input/output terminal 110.

The screen, broadly, is configured from an inspection/review information display section 1101, a determination criteria specification parameter input section 1103, a defect determination criteria definition section 1102, and a non-defective pattern display section 1104. The inspection/review information display section 1101 is a section that displays information such as a device name of a sample wafer targeted for inspection and defect review, and information such as an inspection step name. The determination criteria specification parameter input section 1103 has a function allowing input of various parameters for use in inspection. Parameters to be input include those representing, for example a filename of design data (design data name), names of upper and lower layers (upper layer name, and lower layer name) for use in systematic defect determination, and a view field size (processing area) in a non-defective pattern image creation event.

The defect determination criteria definition section 1102 is a section that is used to specify a detailed condition specification. The section specifies an item that has to be specified in detail to implement a determination condition definition as described above. The specification includes selection of, for example, layer types and pattern feature values for use in determination, threshold values for the feature values, and the number of wiring patterns in a processing area for use in specification of multiple conditions.

The non-defective pattern display section 1104 is a screen that is used to verify a non-defective pattern image for use in processing, and feature values selected therefrom. On this screen, in response to specification of a serial number (ID) of a point of a hot spot on a number input section 1105, the position of the point on a chip is displayed on a chip display section 1106. In addition, a non-defective pattern image created from design data is displayed on a non-defective pattern image display section 1107, the feature value of the non-defective pattern is displayed on a non-defective pattern display section 1108. The screen not only enables retrieval of the hot spot from the hot spot input from the number input section 1105, but also enables specification of the point of the hot spot from the chip display section 1106. The non-defective pattern corresponding to the specified point is displayed on the non-defective pattern image display section 1107, and the computed pattern feature value is displayed on the pattern display section 1108.

When various conditions on the defect determination criteria definition section 1102 of the screen, and storing is executed, the specified systematic defect determination criteria is stored as a systematic defect determination criteria 1074 into the storage section 107. The defect determination criteria definition section 1102 displays points of hot spots (number of target points), which have been computed as processing targets in accordance with the information input from the determination criteria specification parameter input section 1103, and a condition coverage rate (simply, "coverage rate," hereinbelow). The coverage rate indicates the rate of processing-target hot spots that are determined as systematic defects in accordance with the currently specified conditions input from the determination criteria specification parameter input section 1103. As the coverage rate is higher, the specified conditions are stricter, such that the value is usable as a guide to learn whether the condition specification is proper or appropriate. Further, also condition specification for obtaining the coverage rate can be carried out in accordance with the pattern feature value displayed on the non-defective pattern display section 1108.

A systematic defect determination process (see FIG. 3) in defect review according to the defect review method of the present invention method will now be described herebelow.

First, it is assumed that, before the process execution, various types of necessary information are readily stored in the recipe 1071 of the storage section 107. The necessary information includes positional information and information containing various electrooptical system conditions (such as accelerating voltage, probe current, and imaging multiplication factors, for example) necessary when acquiring images by imaging the sample. The positional information refer to positional information of respective defects obtained through inspection of the sample 114 by an optical brightfield or SEM visual inspection device or an optical darkfield defect inspection device.

An operator operates in a manner as described hereinbelow. A recipe for use in measurement is selected from multiple recipes stored (registered) in the recipe 1071 of the storage section 107 via the input/output terminal 110. Thereby, an instruction is issued to the total control section 108 to execute ADR and ADC. Thereafter, the total control section 108 operates so that a review-target wafer is loaded (at step S301), coordinate information of automatic review-target defect is read, and then imaging conditions are specified (at step S302). Thereafter, imaging of a respective target defect is carried out (at step S303).

In ordinarily cases, imaging operation is executed using two multiplications (a low multiplication of about 10000 times and a high magnification of about 50000 times, for example) for the following reasons. In order to execute a classification process of a very small structure, image information sufficient to enable the analysis of the targeted small structure, the imaging magnification thereof has to be set to about 50000 times or more. However, the imaging view field is reduced in size under a condition such as described above. Hence, in the event of a low accuracy of matching between the coordinate of a defect detected by an inspection device and the coordinate of the defect detected by a microscope, it is contemplated that the imaged portion cannot be fully viewed through the view field.

Hence, in the imaging process, three steps of processes described below are executed:

(1) Acquiring an image covering a large view field at a low multiplication factor;
(2) Extracting a defect position from the image view field; and
(3) Imaging of the extracted defect position at a high multiplication.

The process (2) of defect position extraction is implemented by computing a differential image between a defect image of the defect portion (corresponding to the defect position) and an image (reference image) in which not defect is present. This process is executed in the defect extraction section 1061 of the processor and analyzer section 106. Hence, acquiring of the reference image necessary in the defect extraction process is also included in the imaging process (step S303). The reference image necessary in the process is acquired by imaging an identical position of an adjacent chip on the sample wafer.

FIG. 5A is an example of a defect image (image of an area of a defect portion imaged at a low multiplication). FIG. 5B is an example of a reference image. FIG. 5C is an example of an image of a defect position 501 of FIG. 5A, which is imaged at a high multiplication. Image acquisition is carried out in the manner that the electron beam is emitted from the electron gun 115 towards the sample 114, electrons consequently detected from the sample 114 are detected by the electron gun 115, and the amount of detection is imaged. The image data is stored into the storage section 107.

Thereafter, in the classification-dedicated feature value computation section 1062 of the processor and analyzer section 106, the image processing is applied to the acquired image, features, such as size and brightness, of a defect are computed as a quantitative value, thereby to obtain a classification-dedicated feature value. Then, in the defect classification section 1064 of the processor and analyzer section 106, it is determined whether the defect belongs to which one of the classes (at step S305). In the classification process (automatic classification process), teaching data stored in the storage section 107 as image data 1072 are used. The teaching data are preliminarily stored data that are indicative, for example, the types of classification classes, and distributions of the feature values of defects belonging to the respective classes.

Figure 7A:
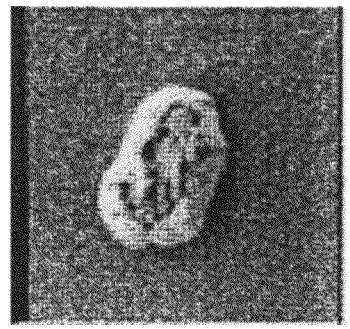
FIG. 7A is a view showing an image of a deposited foreign matter as an example of a foreign-matter related defect.
Figure 7B:
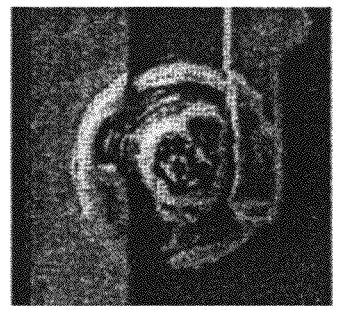
FIG. 7B is a view showing an image of a lower-layer foreign matter as an example of the foreign-matter related defect.
Figure 7C:
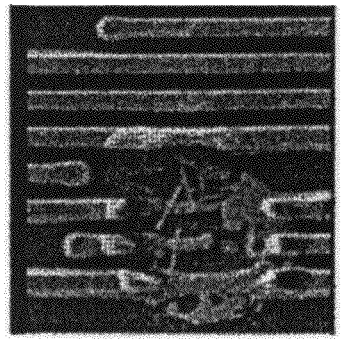
FIG. 7C is an example showing an image of a recess as an example of a surface-recessed defect.
Figure 7D:
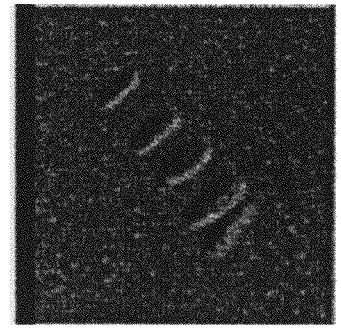
FIG. 7D is a view showing an image of a scratch as an example of the surface-recessed defect.

The classification process is a process that performs a comparison between a feature value of classification-target defect and the teaching data, thereby to determine the class to which the defect belongs. The teaching data is created in the following manner before the execution of the systematic defect determination process shown in FIG. 3. Defect image collection and feature value extraction are executed for a wafer sample provided as a teaching data creation target. Then, the teaching data is created by the teaching data generation section 1063 of the processor and analyzer section 106 in accordance with the computed feature value data input from the operator. FIGS. 7A to 7F, respectively, show examples of classification classes. FIGS. 7A and 7B, respectively, are foreign-matter related defects; FIGS. 7C and 7D, respectively, are surface-recessed defects; and FIGS. 7E and 7F, respectively, examples pattern defects caused due to changes in pattern shape (pattern shape defects). The series of processes, such as the feature value computation and teaching data creation, are disclosed in Japanese Unexamined Patent Application Publication No. 2001-331784 described above.

Figure 7E:
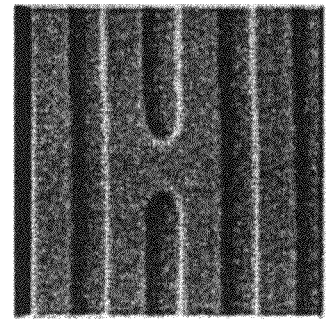
FIG. 7E is a view showing an image of a wiring short circuiting as an example of a pattern-shape changed pattern defect.
Figure 7F:
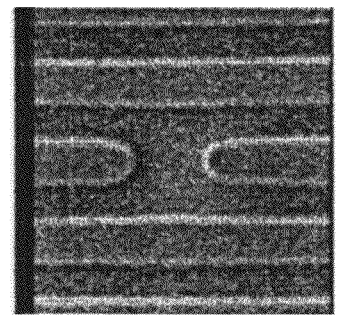
FIG. 7F is a view showing an image of a wiring discontinuation as an example of the pattern-shape changed pattern defect.

Thereafter, depending upon whether or not the classification class determined for the respective one of the defects at the automatic classification process (at step S305) corresponds to a pattern shape defect (as shown in FIG. 7E or 7F), the process branches for the subsequent execution (at step S306). In the event that the defect is not the pattern shape defect, there is not a probability that the defect is the systematic defect. Hence, the defect is determined as a non-systematic defect (at step S312). Otherwise, in the event that the defect is the pattern shape defect, it is determined whether the defect is a systematic defect or an other defect (such as a pattern defect caused due to a deposited foreign matter on an exposure mask, for example).

Figure 6A:
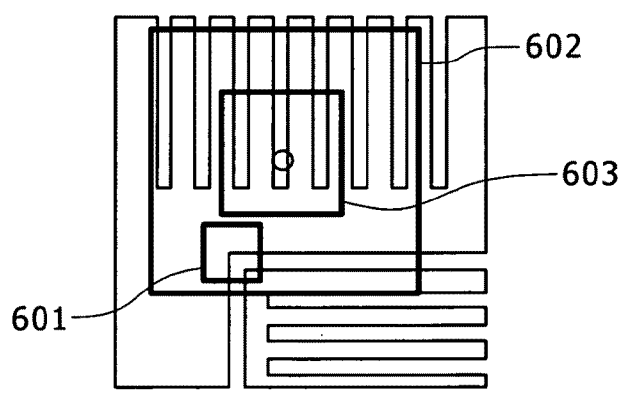
FIG. 6A is a view showing an image of a peripheral circuit pattern including a defect portion.

Hence, the coordinate position of the defect portion in the design data is acquired (at step S307). This process is executed for the following purpose. The coordinate values given corresponding to the respective defect are defined on a coordinate system of the defect inspection device, and hence include a detection coordinate error in the defect inspection device. Since the determination is made in accordance with the comparison with the design data, the coordinate position of the defect portion in the design data becomes necessary. For this purpose, an image taken of a peripheral circuit pattern including the defect portion is acquired (an example of the image is shown in FIG. 6A). The view field size in this case is set greater than the coordinate error output from the defect inspection device. While the amount of error is different depending upon the inspection device, it is considered sufficient to set the view field to about 20 μm.

Further, a pattern image of the periphery of the defect portion is created by use of the design data 102. As a method of creating the pattern image in the design data, similarly as described with reference to FIG. 8, a polygonal data in the design data is first converted into an image data. The imaging process is thus executed at the low magnification for the reason that the probability of the presence of a non-repetitive portion (portion as a corner, such as a portion 601 of FIG. 6A) of the pattern within the view field is high. Alignment is performed between the SEM image acquired at the low magnification and the pattern image created from the design data in the state where the non-repetitive portion is contained, thereby to make it possible to compute an amount of misalignment therebetween. The coordinate of the respective defect in the design data is computed from the amount of misalignment and the defect position coordinate.

Figure 6B:
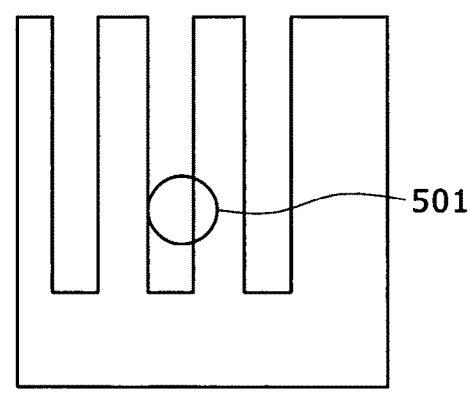
FIG. 6B is a view showing an image in the case where the view field area is set to an area 603 of FIG. 6A.

In the case of a wiring completely configured from cyclic patterns (repetitive patterns), such as a "line+space" pattern, an accurate alignment between the actual defect image (image of the actual image) and the design data image is disabled even in the low multiplication. Example cases thereof will be described herebelow with reference to FIGS. 6A and 6B. With reference to FIG. 6A, in the case where alignment is executed using the view field area is set to an area 602, a non-cyclic portion 601 (non-repetitive portion) is present in the view field, the alignment can be executed. However, in the case where the view field area is set to an area 603, only cyclic patterns are present, as shown in FIG. 6B. Hence, since multiple alignment-successful portions are present, the alignment result cannot be uniquely designated. In this case, according to the present invention, the defect is classified as a non-systematic defect. However, a case can take in which the possibility of alignment varies with alteration in the view field size applied in the execution of the SEM imaging operation (i.e., alteration of the magnification). Hence, the process may be such that, when the alignment result cannot be uniquely designated, the alignment is reexecuted by acquiring images at a different multiplication.

Thereafter, a comparison is performed between the computed defect position coordinate and the coordinate stored in the hot-spot coordinate database 103 (at step S308). As a consequence, if a match is detected between the coordinates (inclusive of the case where the difference in the coordinates is smaller than a predetermined threshold value) is determined that the probability of the systematic defect is high (at step S311).

Otherwise, if the match is detected between the coordinates, then it is further determined whether the defect is a systematic defect. Hence, a design data image about the preliminarily computed coordinate data in the design data is created. The image may either be newly created or created by being preliminarily segmented from an image created for alignment. The view field size in this case is set to be identical to the value used in the creation of the non-defective pattern image in the process shown in FIG. 2. Then, a pattern feature value is computed from the non-defective pattern image in a manner similar to that performed in the process shown in FIG. 2 (at step S309).

Thereafter, it is determined whether the computed pattern feature value satisfies a systematic defect determination criteria 1704 stored in the storage section 107 (at step S310). If the computed pattern feature value satisfies the systematic defect determination criteria 1704, the defect is determined as a systematic defect (at step S311) or otherwise determined as a non-systematic defect (at step S312).

In the process described above, it is determined whether the defect is the systematic defect. The determination sequence for the respective defect is continued until completion of processing of all the defects (at step S313). The determination results obtained in the series of sequence, that is, the classification results obtained in the automatic classification process (step S305) and the finally-obtained systematic defect determination result, are stored as image data 1072 into the storage section 107 in association with the image data.

Figure 3:
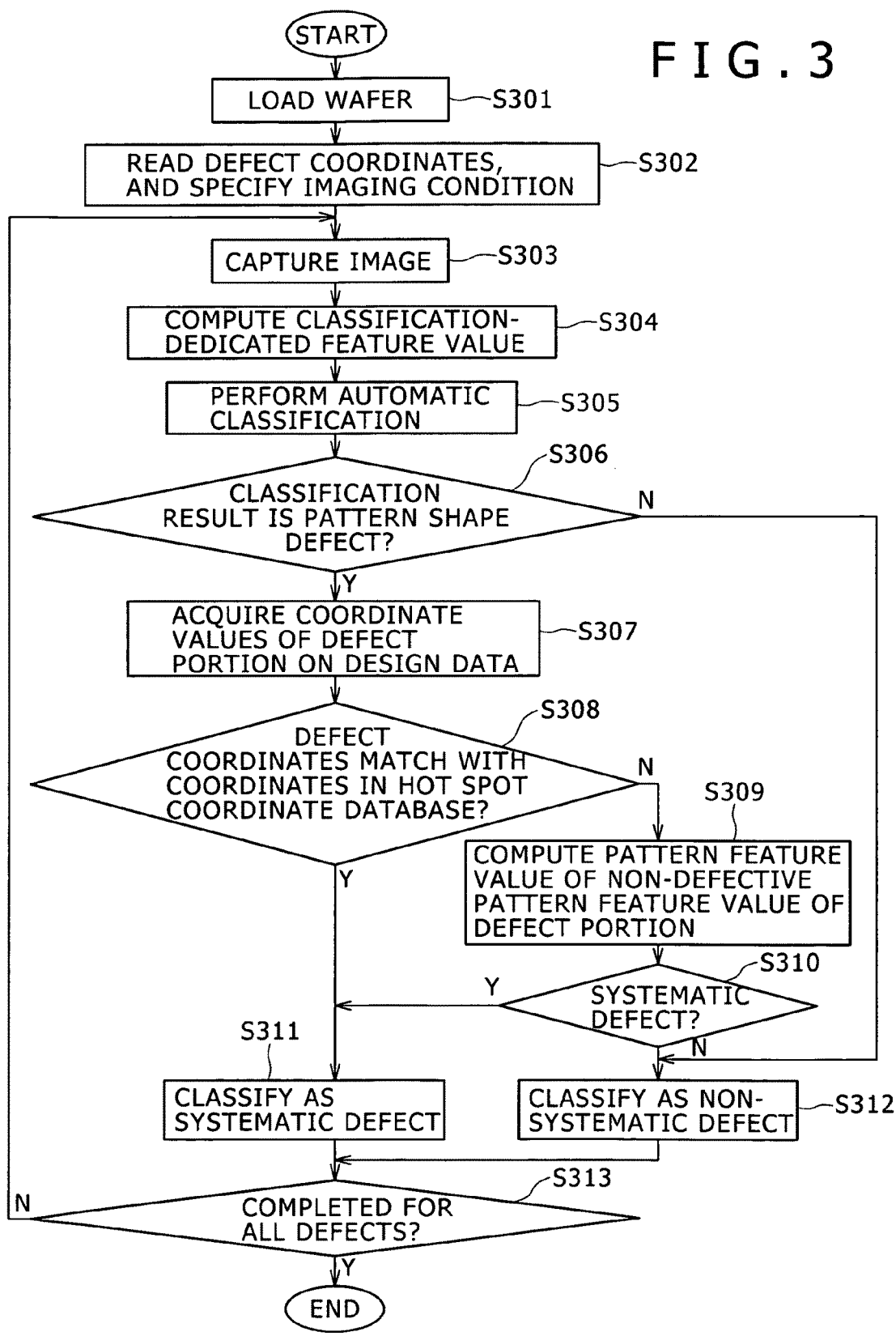
FIG. 3 is a flow diagram of a systematic defect determination process.

In the process shown in FIG. 3, when the classification result and the systematic defect determination result are displayed on a display section 110 in synchronism with image acquisition, the device operator can verify the results of the process in real time. Further, according to the processing flow shown in FIG. 3, it is prerequisite that the automatic classification process and the systematic defect determination process are executed in synchronism with image acquisition, the embodiment of the present invention is not limited thereto. More specifically, while the process may be such that only the automatic classification process is executed in synchronism with defect image acquisition, the systematic defect determination process is executed as a batch process asynchronous with the imaging acquisition.

(Second Embodiment)

A defect review method of a second embodiment of the present invention will be described herebelow. A system configuration as used in the present, second embodiment is identical to that shown in FIG. 1. According to the first embodiment, the non-defective pattern image, which is used for specifying the systematic defect determination criteria as the image data 1072 stored in the storage section 107, is created by use of the coordinate data stored in the hot-spot coordinate database 103. According to the present embodiment, however, the process is characterized in that the defect classification result is utilized for the creation of the non-defective pattern image, thereby to redefine the systematic defect determination criteria 1074. More specifically, as a result of the execution of the process shown in FIG. 3, the classification results and the systematic defect determination results are obtained in respective defect image datasets. The classification results are correlated to the corresponding defect images and stored in the image data 1072 of the storage section 107. Among the data, there are data including the corresponding non-defective pattern image attached thereto. Then, the systematic defect determination criteria is newly redefined in accordance with the classification results.

Figure 12:
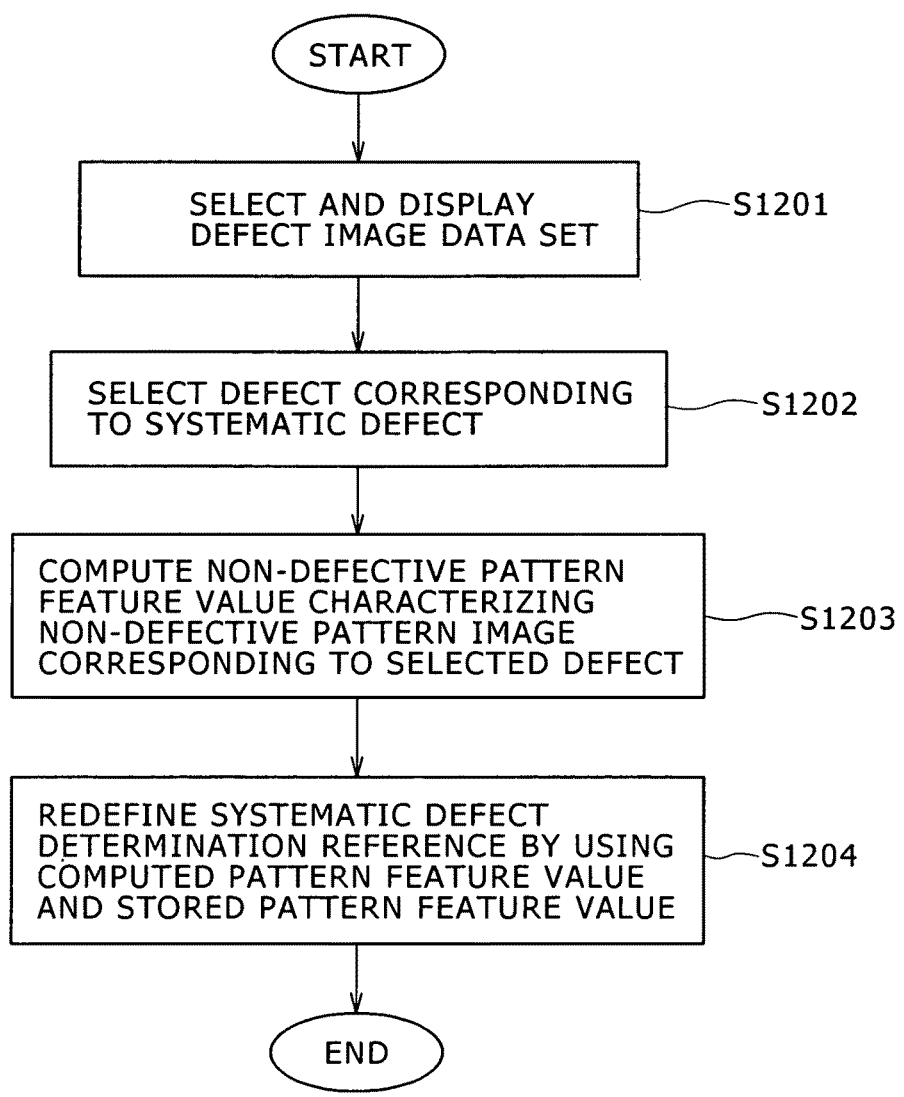
FIG. 12 is a flow chart showing a redefinition procedure for redefining the systematic defect determination criteria.

FIG. 12 shows a flow of the process mentioned above. First, a defect image dataset, which is stored in the image data 1072 of the storage section 107, is displayed on the display screen 1100 by specifying from the input/output terminal 110 (at step S1201).

Figure 13A:
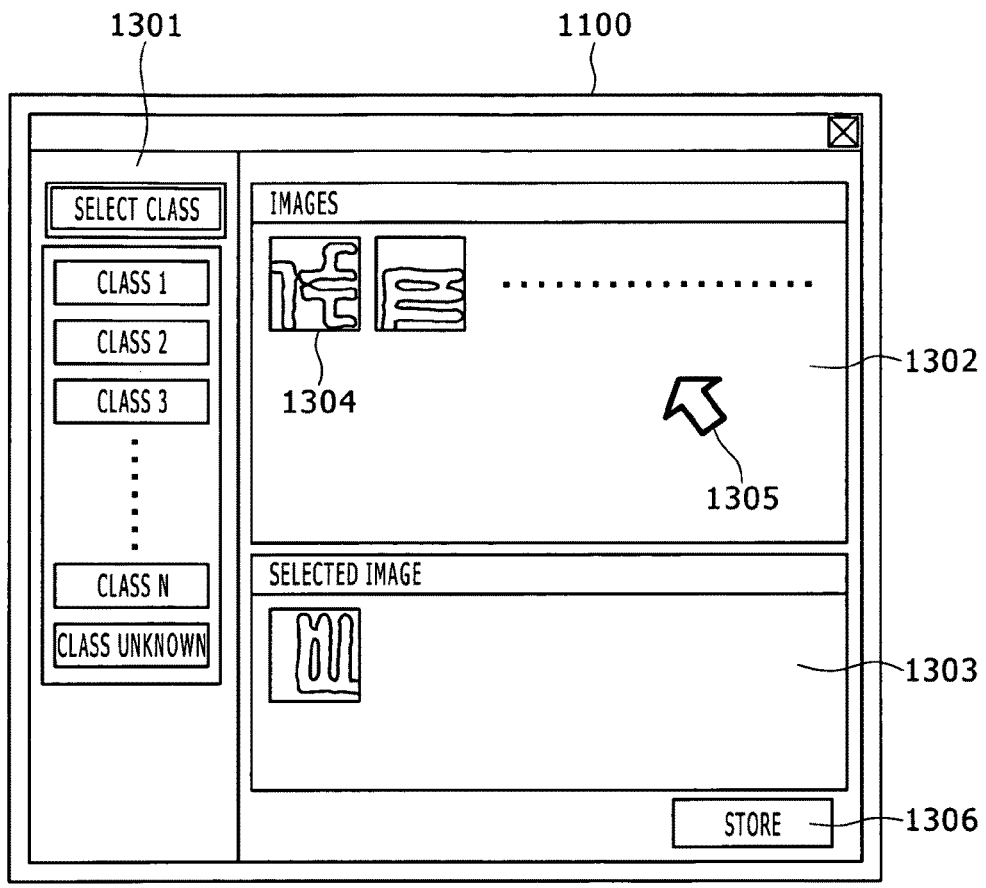
FIG. 13A is view showing an example display of data on an operation screen for a redefinition screen that is used to redefine the systematic defect determination criteria.
Figure 13B:
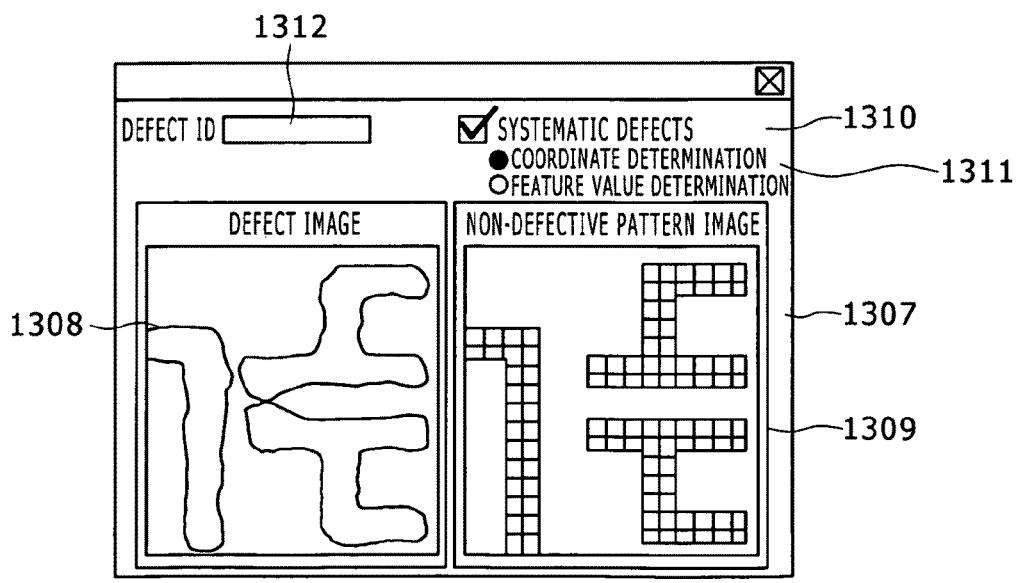
FIG. 13B is a view showing a display window that displays in a juxtaposed (or superposed) manner a defect SEM image corresponding to icon data of a SEM image selected on a previous screen and a non-defective pattern image corresponding to an area thereof.

FIGS. 13A and 13B respectively show examples of screen displays of the image data. An example of a screen display shown in FIG. 13A is configured from a class selection display section 1301, a classification result display section 1302, and a selected image display section 1303. The classification result display section 1302, the selected image display section 1303, or the like displays an icon(s) 1304 of an acquired SEM image(s), and has a function that enables, for example, selection and movement of the image data by using a mouse cursor 1305. Classification classes displayed in the class selection display section 1301 are respectively correlated to the classification results of defect data represented by the icons on the classification result display section 1302 or on the selected image display section 1303. When a class name in the class selection display section 1301 is specified by using the mouse cursor 1305 for example, only defect data belonging only to the corresponding class is displayed on the classification result display section 1302.

When any one of items of the SEM image icons 1304 displayed on the classification result display section 1302 or the selected image display section 1303, a new display window 1307 as shown in FIG. 13B appears. On the display window 1307, a defect SEM image 1308 corresponding to the SEM image icon 1304 selected on the previous screen, and a non-defective pattern image 1309 corresponding to that area are displayed juxtaposed (or superposed). Further, an area 1310 displays whether the defect is determined as a systematic defect. When the defect is displayed as a systematic defect, an area 1311 displays that the determination has been made in accordance with which one of the coordinate and the non-defective pattern feature value. Further, an area 1312 indicates an ID number of the defect.

With the use of the screen as shown in FIG. 13, the process of correcting the classification result can be implemented by moving a SEM image icon 1304 of interest to the respective class displayed in the class selection display section 1301. Further, when performing a correction of the determination result of a systematic defect, the correction can be implemented on the display window 1307 of the screen shown in FIG. 13B.

When an new systematic defect, which has not been detected by that time on the screen, a SEM image icon 1304 corresponding thereto is selected by being moved to the selected image display section 1303 (at step S1202). When a registration button 1306 of the screen is specified, the coordinate values of a selected defect are added to the hot-spot coordinate database 103. Further, a non-defective pattern feature value is computed from a non-defective pattern image corresponding to the coordinate position (at step S1203), and the systematic determination criteria is redefined (at step S1204) using the computed result. In this case, the methods of, for example, extracting the feature value from the non-defective pattern image and of defining the systematic defect determination criteria are carried out similarly as in the processing flow shown in FIG. 2. In the series of processes, hot spot positional information obtainable from the result of lithographic simulation can be supplemented in accordance with occurrence positional information on a systematic defect occurring in an actual process wafer.

Further, according to the method described above, the results, such as defect classification result and systematic defect determination result, are visually verified on the screen, and defect data set as a new systematic defect candidate is selected and registered in accordance with the visual verification result. However, these processes can also be automatically implemented without human intervention. For example, the automatic operation can be implemented in such a manner that, among, for example, defects classified into a specific class selected from the classification classes, and defects determined as a systematic defect, a defect determined in accordance with the non-defective pattern feature value is automatically selected and registered.

Even in a conventional defect review method such as described herein (in the case where, without performing systematic defect determination, only automatic classification is performed for the respective defect image), the above-described update can of course be implemented. That is, as described above, a defect to be newly registered as a systematic defect is visually selected on the screen for displaying the classification results, and the coordinate position and systematic defect determination criteria can be defined.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A candidate-defect classification method, comprising the steps of:
  computing a feature value of a predetermined candidate defect;
  executing a defect classification of the candidate defect, as any one of a pattern shape defect and another type of defect, by using the computed feature value;
  acquiring positional information contained in a design layout data of the pattern, of a candidate defect classified as a pattern shape defect; and
  extracting a systematic defect from candidate defects classified as pattern shape defects, by comparing positional information contained in the design layout data of the acquired candidate defect to positional information of a portion of the sample having a high probability of having a pattern formation failure and that was obtained from the design layout data of the pattern, the systematic defect being caused by a layout shape of the pattern and/or properties of a processor for forming the pattern;
  wherein in the step of extracting the systematic defect, among the candidate defects classified as pattern shape defects, a candidate defect not extracted as a systematic defect in the comparison of the positional information is newly extracted as a systematic defect through an evaluation performed using a systematic defect determination criteria;
  wherein an image of patterns in a portion of the sample inclusive of the portion having a high probability of having a pattern formation failure and that was obtained from the design layout data of the pattern is created from the design layout data, and a pattern feature information is obtained from the created image, thereby creating a systematic defect determination criteria by using the obtained pattern feature information; and
  wherein the pattern feature information to be obtained includes information of an inter-pattern distance and a pattern width in the created pattern image.

2. A candidate-defect classification method according to claim 1, wherein in the step of extracting the systematic defect:
  a portion of the sample having a high probability of having a pattern formation failure is extracted from the design layout data of the pattern;
  a comparison is performed between coordinate data of the extracted portion and the positional information of the candidate defect classified as a pattern shape defect, the positional information of the candidate defect having been acquired in the step of acquiring positional information contained in design layout data; and
  the candidate defect classified as a pattern shape defect is extracted as a systematic defect when matching in the positional information within a predetermined error range.

3. A candidate-defect classification method according to claim 1, wherein in the step of extracting the systematic defect:
  the extraction of a systematic defect from candidate defects classified as pattern shape defects includes a comparison between systematic defect occurrence positional information preliminarily computed by using exposure simulation and stored and the positional information of the candidate defect classified as a pattern shape defect, the positional information of the candidate defect having been contained in design layout data; and the candidate defect classified as a pattern shape defect is extracted as a systematic defect when matching in the positional information within a predetermined error range.

4. A candidate-defect classification method according to claim 1, wherein in the step of acquiring positional information contained in design layout data of the pattern, of a candidate defect classified as a pattern shape defect:

an image of the pattern is created from the design layout data of the pattern;

alignment between the image of the pattern created from the design layout data and an image of the candidate defect to thereby obtain an amount of misalignment; and the positional information contained in the design layout data of the pattern of the candidate defect classified as a pattern shape defect is acquired in accordance with the amount of misalignment between the images and the positional information of the candidate defect in the image of the candidate defect.

5. A candidate-defect classification method according to claim 1, wherein any one of the image created from the design layout data and an image of the candidate defect includes an image of a non-repetitive pattern.

6. A candidate-defect classification apparatus, comprising:

an image processing unit configured to compute a feature value of a predetermined candidate defect;

a defect classifying unit configured to classify the predetermined candidate defect, as any one of a pattern shape defect and another type of defect, by using the computed feature value;

a positional information acquisition unit configured to acquire from a design layout data of the pattern stored in a database, positional information contained in design layout data of the pattern, of a candidate defect classified as a pattern shape defect, by the defect classifying unit; and a systematic defect extraction unit configured to extract a systematic defect from candidate defects classified as the-pattern shape defects, by comparing positional information contained in the design layout data of the candidate defect acquired by the positional information acquisition unit to positional information of a portion of the sample having a high probability of having a pattern formation failure and that was obtained from the design layout data of the pattern, the systematic defect being caused by a layout shape of the pattern and/or properties of a processor for forming the pattern;

wherein in the positional information acquisition unit, an image of the pattern is created from the design layout data of the pattern stored in the database;

alignment between the image of the pattern created from the design layout data and an image of the candidate defect to thereby obtain an amount of misalignment; and the positional information contained in the design layout data of the pattern of the candidate defect classified as a pattern shape defect is acquired in accordance with the amount of misalignment between the images and the positional information of the candidate defect in the image of the candidate defect;

wherein in the systematic defect extraction unit, among the candidate defects classified as pattern shape defects, a candidate defect not extracted as a systematic defect in the comparison of the positional information is newly extracted as a systematic defect through an evaluation performed using a systematic defect determination criteria;

wherein in the systematic defect extraction unit, an image of patterns in a portion of the sample inclusive of the portion having a high probability of having a pattern formation failure and that was obtained from the design layout data of the pattern is created from the design layout data, and a pattern feature information is obtained from the created image, thereby creating a systematic defect determination criteria by using the obtained pattern feature information; and wherein the pattern feature information to be obtained includes information of an inter-pattern distance and a pattern width in the created pattern image.

7. A candidate-defect classification apparatus according to claim 6, wherein in the systematic defect extraction unit:

a portion of the sample having a high probability of having a pattern formation failure is extracted from the design layout data of the pattern; a comparison is performed between coordinate data of the extracted portion and the positional information of the candidate defect classified as a pattern shape defect, the positional information of the candidate defect having been acquired in the step of acquiring positional information contained in design layout data; and the candidate defect classified as a pattern shape defect is extracted as a systematic defect when matching in the positional information within a predetermined error range.

8. A candidate-defect classification apparatus according to claim 6, wherein in the systematic defect extraction unit:

the extraction of a systematic defect from candidate defects classified as pattern shape defects includes a comparison between systematic defect occurrence positional information preliminarily computed by using exposure simulation and stored and the positional information of the candidate defect classified as a pattern shape defect, the positional information of the candidate defect having been contained in design layout data; and the candidate defect classified as a pattern shape defect is extracted as a systematic defect when matching in the positional information within a predetermined error range.

9. A candidate-defect classification apparatus according to claim 6, wherein any one of the images created in the positional information acquisition unit from the design layout data and an image of the candidate defect includes an image of a non-repetitive pattern.

10. A candidate-defect classification method, comprising the steps of:

obtaining pattern feature information from an image of patterns, which includes information of an inter-pattern distance and a pattern width;

creating a systematic defect determination criteria by using the pattern feature information;

obtaining a defect image of patterns of the sample, inclusive of the portion that has a candidate defect detected in an inspection;

comparing the defect image of patterns and the systematic defect determination criteria, and thereby classifying the candidate defect.

11. A candidate-defect classification apparatus, comprising:

a processor and analyzer section, including:

a defect extraction section configured to obtain a defect image of patterns of the sample, inclusive of the portion that has a candidate defect detected in an inspection preliminarily performed by another device;

a classification-dedicated feature value computation section configured to obtain pattern feature information from the image of patterns, which includes information of an inter-pattern distance and a pattern width;

a defect classification section configured to create a systematic defect determination criteria by using the pattern feature information; and a systematic defect determination section configured to compare the defect image of patterns and the systematic defect determination criteria, and thereby classify the candidate defect.

12. The candidate-defect classification apparatus of claim 11, further comprising:
a storage unit, including:
system defect determination criteria,
teaching data,
image data, and
a recipe;
a total control section; and
an input/output interface;
wherein the processor and analyzer section further comprises:
a teaching data creation section,
a non-defective pattern image generation section, and
a non-defective pattern feature value computation section.

13. A candidate-defect classification method according to claim 1, wherein the feature value of the predetermined candidate defect is computed by processing a scanning electron microscope (SEM) image a candidate defect detected in an inspection, from a sample including a pattern formed thereon, the inspection being preliminarily performed by an inspection device other than the scanning electron microscope (SEM).

14. A candidate-defect classification apparatus according to claim 6, wherein the image processing unit is configured to compute a feature value of the predetermined candidate defect by processing an SEM image acquired by a scanning electron microscope (SEM) image acquisition unit, the SEM image acquisition unit being configured to acquire a candidate defect detected in an inspection, from a sample including a pattern formed thereon, the inspection being preliminarily performed by an inspection device other than the SEM image acquisition unit.

15. A candidate-defect classification method according to claim 10, wherein the step of obtaining pattern feature information is preceded by a step of creating an image of patterns of a sample, inclusive of a portion that has a high probability of having a pattern formation failure and that was obtained from the design layout data of a pattern from the design layout data.

16. A candidate-defect classification apparatus according to claim 11, further comprising:
a scanning electron microscope (SEM) image acquisition unit configured to create an image of patterns of a sample, inclusive of a portion that has a high probability of having a pattern formation failure and that was obtained from the design layout data of a pattern from the design layout data.

* * * * *